United States Patent
Wang et al.

(10) Patent No.: US 7,848,181 B2
(45) Date of Patent: Dec. 7, 2010

(54) METHOD AND APPARATUS FOR OPTIMIZING OPTICAL DISC NAVIGATORS

(75) Inventors: Bei Wang, Shanghai (CN); Gongming Wei, Shanghai (CN); Sheng Jin, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 1015 days.

(21) Appl. No.: 11/570,620

(22) PCT Filed: Jun. 7, 2005

(86) PCT No.: PCT/IB2005/051837

§ 371 (c)(1),
(2), (4) Date: Dec. 14, 2006

(87) PCT Pub. No.: WO2006/000927

PCT Pub. Date: Jan. 5, 2006

(65) Prior Publication Data

US 2007/0192799 A1    Aug. 16, 2007

(30) Foreign Application Priority Data

Jun. 22, 2004    (CN) .................... 2004 1 0069479

(51) Int. Cl.
*G06F 13/00*    (2006.01)
*G06F 3/00*    (2006.01)
*H04N 5/445*    (2006.01)

(52) U.S. Cl. .................... 369/30.03; 725/52; 725/53

(58) Field of Classification Search ............. 369/30.03; 710/5; 725/52, 53
See application file for complete search history.

(56) References Cited

U.S. PATENT DOCUMENTS

| | | | |
|---|---|---|---|
| 5,929,857 A | | 7/1999 | Dinallo et al. |
| 6,121,968 A | | 9/2000 | Arcuri et al. |
| 6,138,175 A | * | 10/2000 | deCarmo ................ 710/5 |
| 2002/0078144 A1 | | 6/2002 | Lamkin et al. |
| 2003/0161615 A1 | | 8/2003 | Tsumagari et al. |
| 2004/0078357 A1 | | 4/2004 | LaChapelle et al. |
| 2004/0148590 A1 | * | 7/2004 | Lapitski et al. ............. 717/124 |

OTHER PUBLICATIONS

ISR/Written Opinion of the International Searching Authority PCT/IB2005/051837.

* cited by examiner

*Primary Examiner*—Brian E Miller
*Assistant Examiner*—Andrew J Sasinowski

(57) ABSTRACT

The present invention provides a method and apparatus for optimizing optical disc navigators. According to the present invention, the optical disc player sets the optimum optical disc navigator that can be realized as the optical disc navigator for playing the optical disc by testing and adjusting basing on the optical disc navigator resources that are retrieved from the optical disc playing system (including the optical disc player, optical disc and network or other storage media) and the functions that can be realized by the default optical disc navigator within the optical disc playing system, so as to achieve the purpose of fully utilizing the resources and smooth playing.

7 Claims, 3 Drawing Sheets

METHOD AND APPARATUS FOR OPTIMIZING OPTICAL DISC NAVIGATORS

BACKGROUND OF THE INVENTION

The present invention relates to the field of optical storage, more particularly to a method and apparatus for optimizing optical disc navigators.

The development of optical storage technology continuously sets new records for the storage volume of optical discs, and at the same time fully develops the optical disc playing system. Various interactive optical disc playing functions have brought unprecedented enjoyment, e.g., a user may control the playing process with menu and may select playing Internet information related to the content of the optical disk.

The optical disc playing navigator is a very important application software of an optical disc player. With various function modules of the optical disc playing navigator, the optical disc player is able to realize a number of important functions, such as controlling the decoding of the content of the optical disc, setting the sequence of the programs to be played and providing menu operations. Generally, the optical disc player can control the playing of the disc with a default optical disc navigator. If an optical disc player does not have a default optical disc navigator, the optical disc player can generally obtain an optical disc navigator from an optical disc or other storage media to play the corresponding optical disc.

The normal operation of an optical disc navigator requires sufficient support of the hardware platform, as well as of corresponding software resources, e.g., corresponding application programs or library functions that can be called. The hardware platform and software resources required for the normal operation of an optical disc navigator correspond to the functions of the optical disc navigator. The more and stronger functions an optical disc navigator can realize, the more it requires from the hardware platform and the software resources.

In traditional technology, the optical disc navigator is stored in an optical disc player by default, or in an optical disc. The functions of this optical disc navigator are preset and based on particular hardware platform and software resources.

If an optical disc navigator has many preset functions, while in practical operation, one of the application programs to be called by the optical disc navigator is not retrieved or is damaged, or the hardware platform for playing the optical disc is not compatible with this optical disc navigator, this optical disc navigator cannot operate normally, and accordingly, cannot play the optical disc normally.

In contrast, if an optical disc navigator has fewer preset functions, while in practical operation, there are many optical disc playing platform and software resources of the optical disc navigator, in other words, not only the preset functions of the optical disc navigator but also other navigator functions not included in those preset ones are supported, the resources supporting the extra functions will be wasted. In the above two cases, the playing quality of the optical disc will both be affected, thus, the optimum playing quality cannot be obtained.

Therefore, there is a need for a method and apparatus for optimizing the optical disc navigator, such that the optical disc can be smoothly played, and at the same time, the resources of the optical disc navigator can be fully utilized, and all the functions of the optical disc navigator that can be supported are realized, thereby the best playing quality of the optical disc is obtained.

SUMMARY OF THE INVENTION

It is an object of the present invention to provide a method for optimizing the optical disc playing navigator to determine a navigator producing the best playing quality, thus the drawback of the prior art is avoided.

It is another object of the present invention to provide an apparatus for optimizing the optical disc navigator to determine the best optical disc navigator to play the disc.

The method for optimizing the optical disc playing navigator of the present invention comprises steps of: retrieving available optical disc navigator resources to support the corresponding functions of the optical disc navigator; testing the preset functions of the default optical disc navigator to determine the functions that can be realized by the default optical disc navigator; and setting the optical disc navigator having the corresponding functions for playing the optical disc according to the functions of the optical disc navigator that are supported by the retrieved optical disc navigator resources and the functions that can be realized by the default optical disc navigator.

The apparatus for optimizing the optical disc playing navigator of the present invention comprises: retrieving means for retrieving available optical disc navigator resources to support the corresponding functions of the optical disc navigator; testing means for testing the functions of an optical disc navigator, including testing the preset functions of the default optical disc navigator to determine the functions that can be realized by the default optical disc navigator; and setting means for setting the optical disc navigator having the corresponding functions for playing the optical disc according to the functions that are supported by the retrieved optical disc navigator resources and the functions that can be realized by the default optical disc navigator.

The setting method and apparatus for optimizing the optical disc navigator of the present invention can realize the optimum functions of the optical disc navigator with the permission of the optical disc playing resources.

The following description with reference to the drawings and the claims provide a more comprehensive understanding of the present invention, so that the objects of the present invention and the implementations thereof may be clearer and more explicit.

BRIEF DESCRIPTION OF THE DRAWINGS

With reference to the following figures, detailed description will be made with the aid of the embodiments.

The same reference numerals in the figures represent the same, similar or corresponding features or functions.

DETAILED DESCRIPTION OF THE PREFERRED EMBODIMENTS

According to the present invention, upon retrieving the resources of an optical disc navigator and the functions that can be realized by the default optical disc navigator of the optical disc player from within the retrievable range of the optical disc playing system (including the optical disc player, optical disc and network or other storage media), the optical disc player sets the optimum optical disc navigator that can be realized as the optical disc navigator for playing the optical disc by testing and adjusting, so as to achieve the purpose of fully utilizing the resources and smooth playing.

Although the capabilities of the functions provided by traditional optical disc navigators are not equal, no corresponding function levels are categorized. Whereas, in the present invention, the functions of an optical disc navigator are categorized into several categories in accordance with their respective function characteristics, and each category is divided into several levels ranging from a lower level to a higher level. For example, the functions of an optical disc navigator can be categorized into categories of navigation function, decoding control function, application program downloading function and interacting function with the user, etc. In the navigation function category, the functions of the optical disc player can be further divided, from a lower lever to a higher level, into functions of decoding and playing the content of an optical disc solely in accordance with the physical storing sequence, providing a play-list of the content of the optical disc, and providing menu operations.

In practice, the categorization of the functions of an optical disc navigator and the division of the functions in each function category may be determined by the manufacturers based upon their needs. The present invention only makes exemplary divisions for one category of functions of an optical disc navigator, which will be described hereafter.

Figure 1:
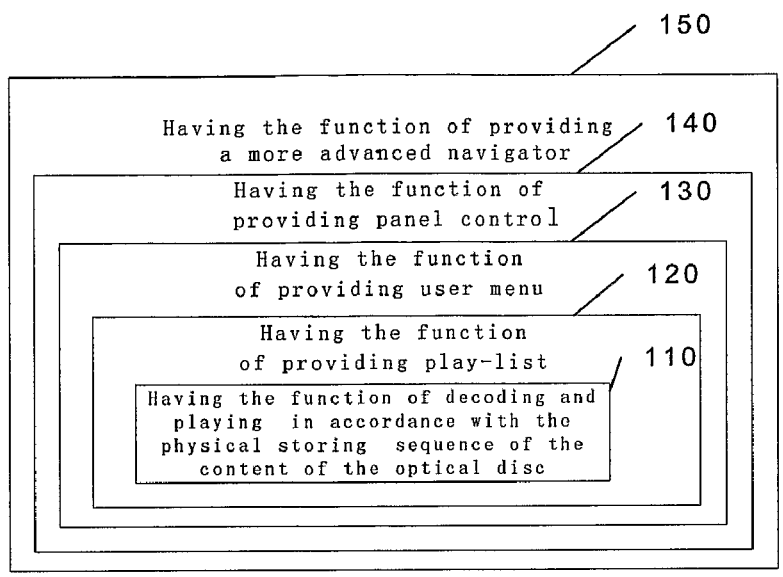
FIG. 1A is a schematic diagram showing the various levels of functions that can be realized by an optical disc navigator.
FIG. 1B is a schematic diagram showing the resources required to realize the various levels of functions of an optical disc navigator as shown in FIG. 1A.

FIG. 1A shows several levels of functions in the navigation function category of the optical disc navigator. As shown in FIG. 1A, Function 110 is the lowest-level navigator function in the navigation function category, and also can be realized with the least amount of resources. According to Function 110, the optical disc player can only decode and play in accordance with the physical sequence in which the content of the optical disc is stored in the optical disc. If an optical disc player can play an optical disc, the optical disc navigator of this optical disc player can at least realize Function 110, otherwise, this optical disc player will be unable to play this optical disc. The present invention is subject to that at least Function 110 can be realized.

Function 120 provides a play-list for the content of an optical disc, which allows a user to select the content of the optical disc to play from the play-list at his/her will, without being restricted by the physical sequence in which the content of the optical disc is stored in the optical disc. Function 130 can provide menu operations, which allow a user to control the playing process of the content of the optical disc with an external equipment, such as a remote controller, a keyboard, etc. Function 140 can provide panel control, which allows a user to control a number of different panels and arrange the displaying effects of many different menus. Function 150 is another higher-level function.

FIG. 1A shows that higher-level functions include lower-level functions, and the smooth realization of lower-level functions is the precondition for the realization of higher-level functions. The realization of the higher-level functions in each function category of an optical disc navigator is based on the realization of all the lower-level functions, in other words, only when all the functions which are of lower levels than a higher-level function are realized, can this higher-level function be realized with the support of corresponding resources.

The level of an optical disc navigator is therefore defined. For example, if an optical disc navigator is of a higher level than another optical disc navigator, it means that the optical disc navigator which is of a higher level can provide one more designated function or several more designated functions than the other optical disc navigator. In contrast, if an optical disc navigator is of a lower level than another optical disc navigator, it means that the optical disc navigator which is of a lower level has one less designated function or several less designated functions than the other optical disc navigator.

Figure 1B:
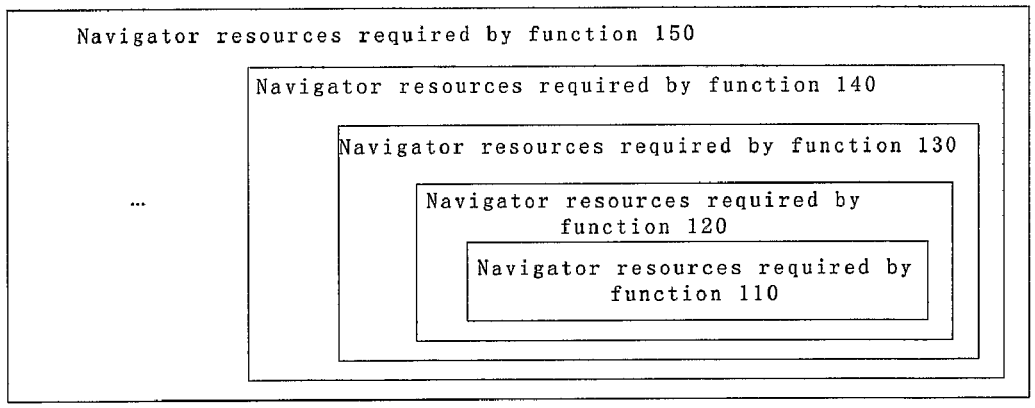

FIG. 1B shows the resources required for the realization of each navigator function in FIG. 1A. Combined with FIG. 1A, FIG. 1B shows that the higher a function's level is, the more resources the realization of this function requires, and the resources required for the realization of an higher-level function include all the resources required for the realization of all the lower-level functions. Therefore, a higher-level optical disc navigator cannot operate normally unless a lower-level optical disc navigator can operate normally.

The divisions of functions and resources shown in FIG. 1A and FIG. 1B and their corresponding relationship have paved the path for the optimization of the optical disc navigator, such that the optical disc navigator can be optimized in accordance with the corresponding relationship between the functions and resources.

Figure 2:
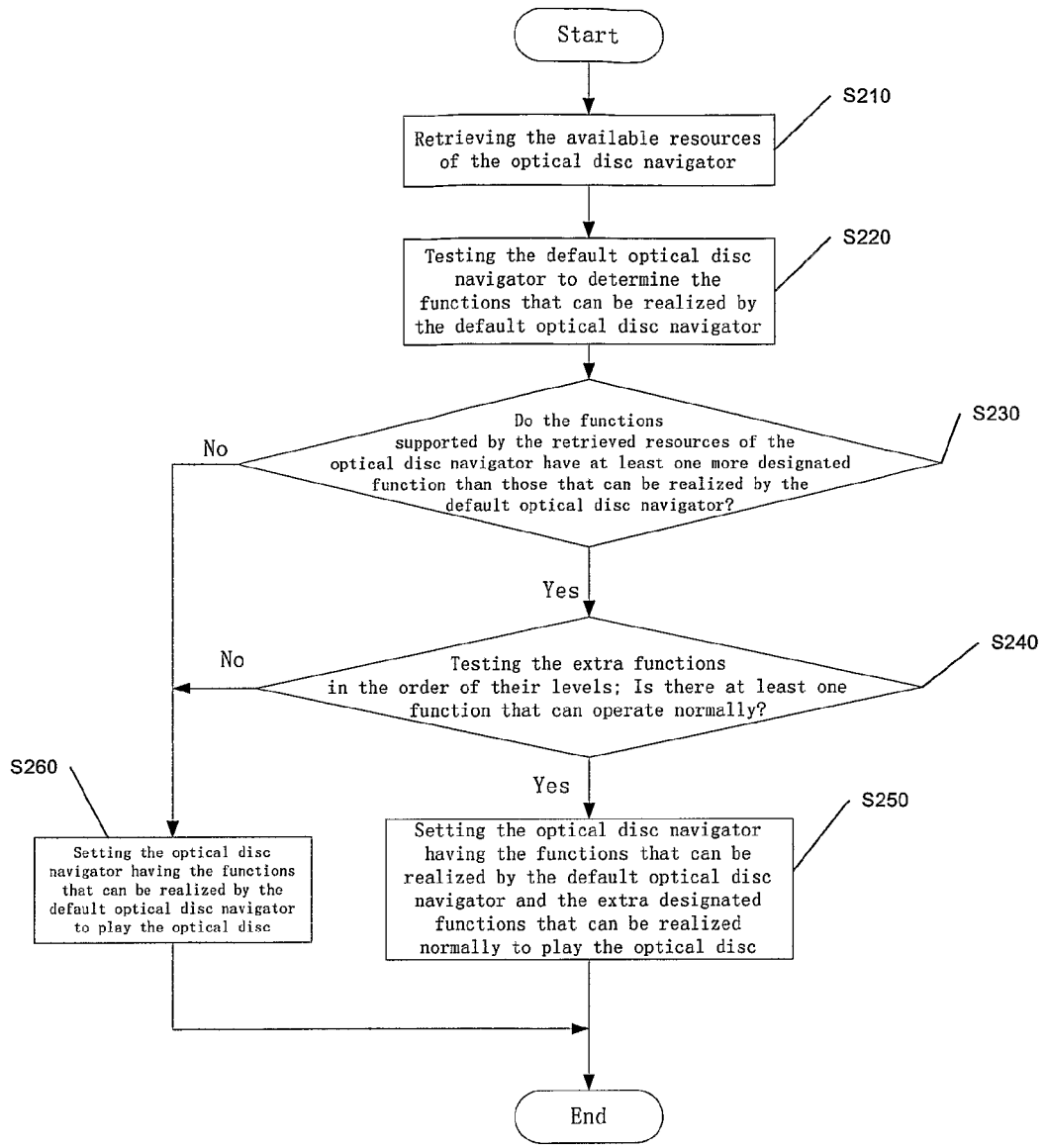
FIG. 2 is a flow chart of the method for optimizing an optical disc navigator according to one embodiment of the present invention.

FIG. 2 is a flow chart of the method for optimizing an optical disc navigator according to one embodiment of the present invention. First, an optical disc player retrieves the resources of the optical disc navigator (S210). The scope of such retrieving includes retrieving resources in the local storage medium of the optical disc player, such as the hard disc, etc., and may also include retrieving resources in the optical disc to be played and linked corresponding websites. Some of the current optical disc players can be linked to corresponding network, so that the scope where an optical disc player may obtain playing resources extends to the corresponding Internet.

Further, the optical disc player tests the functions of the default optical disc navigator in the optical disc player to determine the functions that it can realize (S220). Generally, every optical disc player should have a default optical disc navigator. Even if the optical disc player does not have a default optical disc navigator, the optical disc player can still download an optical disc navigator from an optical disc or a linked network as the default optical disc navigator. This default optical disc navigator is designated to realize some corresponding preset functions. However, the resources of an optical disc navigator may change, e.g., a library function is damaged or an application software is deleted, and some of the preset functions thus cannot be realized, therefore the functions that the default optical disc navigator can actually realize may be determined by testing. The testing of the preset functions of a default optical disc navigator shall preferably begin with higher-level functions, as it is unnecessary to test the lower-level functions if a higher-level function can be realized.

Next, the functions of the optical disc navigator supported by the retrieved resources of the optical disc navigator are compared with those that can be realized by the default optical disc navigator (step S230). The functions of the optical disc navigator being compared are generally designated functions, i.e. the designated functions in the function level sequence. The purpose of such comparing is to determine whether the functions of the optical disc navigator supported by the retrieved resources of the optical disc navigator have at least one more designated function than those that can be realized by the default optical disc navigator.

If the functions of the optical disc navigator that are supported by the retrieved resources of the optical disc navigator have at least one more designated function than those that can be realized by the default optical disc navigator, the extra functions shall be tested according to their levels (S240) to determine whether the extra functions can operate normally. According to the level of the function, the extra functions of the optical disc navigator are tested preferably from lower-level ones to higher-level ones, so as to ensure that the optical disc navigator can operate normally and smoothly when the optical disc is being played. Testing the extra functions of the optical disc navigator from higher-level ones to lower-level ones can save time, so it is also feasible.

Finally, the optical disc player sets an optical disc navigator to play the optical disc according to the testing results (S250), which navigator can realize the functions that the default optical disc navigator can realize and the extra functions of the optical disc navigator that have been tested and proved to be able to operate normally.

As stated in the description of FIGS. 1A and 1B, the realization of a function of an optical disc navigator is based on the realization of the lower-level functions of the optical disc navigator, so the functions that can be realized by the default optical disc navigator have included all the lower-level functions of the optical disc navigators. Therefore, if the functions supported by the retrieved resources of the optical disc navigator are more than those that can be realized by the default optical disc navigator, such extra functions must be of higher levels than the functions that can be realized by the default optical disc navigator. Thus, the optical disc navigator for playing the optical disc can be set based on the original default optical disc navigator and by combining the functions that can be realized by the default optical disc navigator and the extra functions supported by the retrieved resources. Of course, the optical disc navigator can be set directly by combining the functions that can be realized by the default optical disc navigator and the extra functions supported by the retrieved resources.

If the functions supported by the retrieved sources of the optical disc navigator are not more than those that can be realized by the default optical disc navigator, or the extra functions cannot operate normally, the optical disc player will set an optical disc navigator having the functions that can be realized by the default optical disc navigator to play the optical disc (S260).

With the method for optimizing the optical disc navigator as shown in FIG. 2, an optical disc navigator having the functions than can be realized by the default optical disc navigator and the extra functions supported by the resources is set to be the optical disc navigator to play the optical disc. This optical disc navigator can ensure that the optical disc is smoothly played, as well as that the resources of the optical disc navigator of the optical disc playing system are fully utilized.

Through optimization, the original default optical disc navigator is replaced by the newly set optical disc navigator. This newly set optical disc navigator and the corresponding resources of the optical disc player can be stored in the optical disc player, which can be used for present playing as well as for future playing or be used as the basis for future optimization of the optical disc player.

Figure 3:
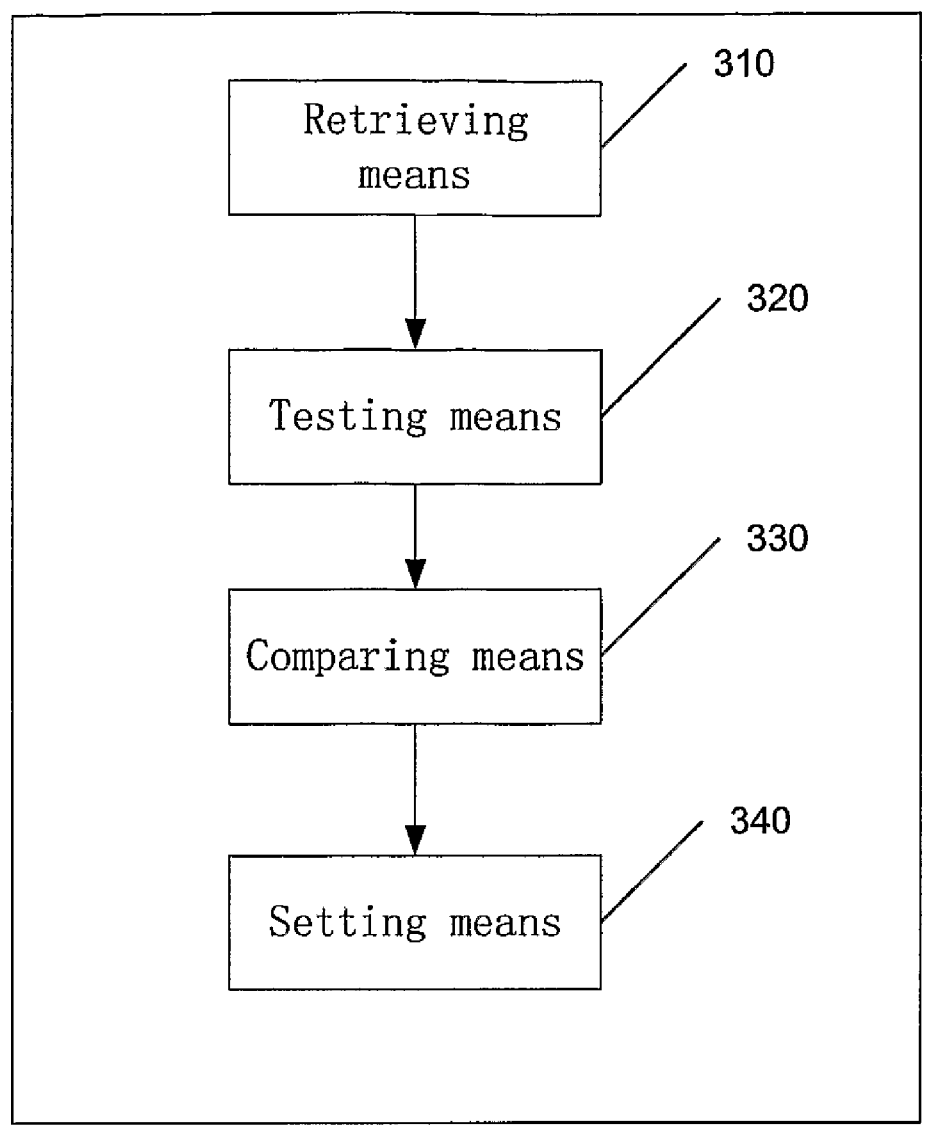
FIG. 3 is a block diagram of the apparatus for optimizing an optical disc navigator according to one embodiment of the present invention.

FIG. 3 is a block diagram of an apparatus 300 for optimizing an optical disc navigator according to one embodiment of the present invention. Apparatus 300 retrieves available resources of the optical disc navigator within the retrievable scope of the optical disc playing system and determines an optimized optical disc navigator to play the optical disc in accordance with the resources of the optical disc navigator and the default optical disc navigator. The optical disc playing system includes an optical disc player, and may further include the optical disc to be played and corresponding linked networks, etc.

Apparatus 300 includes retrieving means 310 for retrieving the resources of the optical disc navigator in the optical disc playing system. The resources of the optical disc navigator are used for supporting the corresponding functions of the optical disc navigator. The resources of the optical disc navigator include the corresponding application programs or library functions that can be called. The retrieving scope of the resources of the optical disc navigator includes the storage medium in the optical disc player, the optical disc and/or corresponding linked networks.

Apparatus 300 further includes testing means 320 for testing whether the functions of an optical disc navigator can operate normally. The functions of the optical disc navigator to be tested include the preset functions of the default optical disc navigator, as well as the functions of the optical disc navigator that can be supported in form by the retrieved optical disc playing resources.

Apparatus 300 further includes comparing means 330 for comparing the functions of the optical disc navigator supported by the retrieved resources of the optical disc navigator and those that can be realized by the default optical disc navigator. It may be determined according the comparison whether the functions of the optical disc navigator supported by the retrieved resources of the optical disc navigator have at least one more designated function than those that can be realized by the default optical disc navigator. As stated in the description of FIGS. 1A and 1B, the realization of a function of an optical disc navigator is based on the realization of all the lower-level functions of the optical disc navigators, so the functions that can be realized by the default optical disc navigator have included all the lower-level functions of the optical disc navigators. Therefore, if the functions supported by the retrieved resources of the optical disc navigator are more than those that can be realized by the default optical disc navigator, such extra functions must be of higher levels than those that can be realized by the default optical disc navigator.

Apparatus 300 further includes setting means 340 for setting the optical disc navigator having the corresponding functions to play the optical disc in accordance with the extra functions that are supported by the retrieved resources of the optical disc navigator and have been tested and proved to be able to operate normally and the functions that can be realized by the default optical disc navigator. The optical disc navigator can be set based on the original default optical disc navigator and by combining the functions that can be realized by the default optical disc navigator and the extra functions that can be supported by the retrieved resources. Of course, the optical disc navigator can be set directly by combining the functions that can be realized by the default optical disc navigator and the extra functions supported by the retrieved resources.

After the apparatus 300 sets the optical disc navigator for playing the optical disc according to the retrieved resources of the optical disc navigator and the functions that can be realized by the default optical disc navigator, the optical disc playing apparatus thus includes an optimized optical disc navigator which can ensure the smooth playing of the optical disc and the realization of the best navigation functions with the currently available resources.

The present invention further provides an optical disc playing system which comprises an optical disc reading apparatus and an apparatus for optimizing the optical disc navigator.

The apparatus for optimizing the optical disc navigator comprises: retrieving means for retrieving available resources of the optical disc navigator for supporting the corresponding functions of the optical disc navigator; testing means for testing the functions of an optical disc navigator, including testing the default optical disc navigator to determine the functions that can be realized by the default optical disc navigator, and testing whether the functions that are formally supported by the retrieved resources of the optical disc navigator can operate normally; and setting means for setting the optical disc navigator having the corresponding functions to play the optical disc in accordance with the functions supported by the retrieved resources of the optical disc navigator and the functions that can be realized by the default optical disc navigator.

The apparatus for optimizing the optical disc navigator in the optical disc playing system may further include comparing means for comparing the functions of the optical disc navigator supported by the retrieved resources of the optical disc navigator and those that can be realized by the default optical disc navigator.

In this optical disc playing system, said optical disc reading apparatus uses the functions of the optical disc navigator which is set by the apparatus for optimizing the optical disc navigator to play the optical disc.

With the present invention, the optical disc playing system may fully utilize the available resources of the optical disc navigator and ensure the normal operation of the optical disc navigator.

Although the present invention is described in conjunction with the embodiments, it is obvious for those skilled in the art to make various substitutions, modifications and variations according to the above description. Therefore, all such substitutions, modifications and variations shall fall within the spirit and scope of the claims of the present invention.

What is claimed is:

1. A method for optimizing an optical disc navigator, comprising steps of:
   (a) retrieving available resources of the optical disc navigator, the resources being used for supporting corresponding functions of the optical disc navigator;
   (b) testing preset functions of a default optical disc navigator to determine functions that can be realized by the default optical disc navigator, said testing being performed beginning with higher-level functions;
   (c) setting the optical disc navigator to play the optical disc in accordance with the corresponding functions being supported by the retrieved resources of the optical disc navigator and with the functions that can be realized by the default optical disc navigator;
   (d) comparing the functions being supported by the retrieved resources of the optical disc navigator with the functions that can be realized by the default optical disc navigator, wherein if the functions being supported by the retrieved resources of the optical disc navigator have at least one more designated function than the functions that can be realized by the default optical disc navigator, then the corresponding functions in step (c) include the functions that can be realized by the default optical disc navigator and said at least one more designated function of the optical disc navigator; and
   (e) testing whether said at least one more designated function of the optical disc navigator can operate normally, said testing being performed from a lower-level to a higher level, wherein if the at least one more designated function of the optical disc navigator are tested and proved to be able to operate normally, the corresponding functions in step (c) include the functions that can be realized by the default optical disc navigator and the at least one more designated function that have been tested and proved to be able to operate normally.

2. The method of claim 1, wherein the testing of the at least one more designated function of the optical disc navigator in step (e) includes: testing in the order of levels of the functions.

3. The method of claim 1, wherein the retrieving of the resources of the optical disc navigator in step (a) includes retrieving the resources of the optical disc navigator on the optical discs and corresponding networks.

4. An apparatus for optimizing an optical disc navigator, comprising:
   retrieving means, for retrieving available resources of the optical disc navigator, the resources being used for supporting corresponding functions of the optical disc navigator;
   testing means for testing functions of the optical disc navigator, including testing preset functions of a default optical disc navigator to determine functions that can be realized by the default optical disc navigator, said testing being performed beginning with higher-level functions;
   setting means, for setting the optical disc navigator to play the optical disc in accordance-with the corresponding functions supported by the retrieved resources of the optical disc navigator and the functions that can be realized by the default optical disc navigator; and
   comparing means, for comparing the corresponding the functions being supported by the retrieved resources of the optical disc navigator and the functions that can be realized by the default optical disc navigator; wherein if the corresponding functions supported by the retrieved resources of the optical disc navigator have at least one more designated function than the functions that can be realized by the default optical disc navigator, the functions of the optical disc navigator-being set by said setting means include the functions that can be realized by the default optical disc navigator and said at least one more designated function of the optical disc navigator, wherein said testing means is used for testing whether said at least one more designated function of optical disc navigator can operate normally, said testing being performed from a lower-level to a higher level, wherein if said at least one more designated function of the optical disc navigator have been tested and proved to be able to operate normally, the functions of the optical disc navigator set by said setting means include the functions that can be realized by the default optical disc navigator and said at least one more designated function proven to operate normally.

5. The apparatus of claim 4, wherein the retrieving the resources of the optical disc navigator by said retrieving means includes retrieving the resources of the optical disc navigator on the optical discs and corresponding networks.

6. The apparatus of claim 4, wherein the testing of said at least one more designated function of the optical disc navigator by the testing means is performed in the order of the levels of the functions.

7. An optical disc playing system, comprising:
   an optical disc reading apparatus; and
   an apparatus for optimizing an optical disc navigator, comprising:
      retrieving means for retrieving available resources of the optical disc navigator, the resources being used for supporting corresponding functions of the optical disc navigator;

testing means for testing the functions of the optical disc navigator, the testing means including testing preset functions of a default optical disc navigator to determine functions that can be realized by the default optical disc navigator, said testing being performed beginning with higher-level functions; and setting means for setting the optical disc navigator having the corresponding functions to play the optical disc in accordance with the retrieved resources of the optical disc navigator and functions that can be realized by a default optical disc navigator;

wherein said optical disc reading apparatus uses the functions of the optical disc navigator which is set by the apparatus for optimizing the optical disc navigator to play the optical disc; and comparing means for comparing the functions of the optical disc navigator being supported by the retrieved resources of the optical disc navigator and the functions that can be realized by the default optical disc navigator; wherein if the functions supported by the retrieved resources of the optical disc navigator have at least one more designated function than the functions that can be realized by the default optical disc navigator, the functions set by said setting means include the functions that can be realized by the default optical disc navigator and said at least one more designated function of the optical disc navigator.

* * * * *